(12) United States Patent
Sungkhaphong et al.

(10) Patent No.: US 9,390,762 B1
(45) Date of Patent: Jul. 12, 2016

(54) METHOD FOR ASSEMBLING A STORAGE DEVICE

(71) Applicant: Western Digital Technologies, Inc., Irvine, CA (US)

(72) Inventors: Komgrit Sungkhaphong, Bangkok (TH); Pattara Aryuwat, Pathum Thani (TH)

(73) Assignee: Western Digital Technologies, Inc., Irvine, CA (US)

( * ) Notice: Subject to any disclaimer, the term of this patent is extended or adjusted under 35 U.S.C. 154(b) by 135 days.

(21) Appl. No.: 14/225,000

(22) Filed: Mar. 25, 2014

Related U.S. Application Data

(62) Division of application No. 12/604,145, filed on Oct. 22, 2009, now Pat. No. 8,707,531.

(51) Int. Cl.
  *G11B 33/00* (2006.01)
  *G11B 33/02* (2006.01)
(52) U.S. Cl.
  CPC .................................. *G11B 33/022* (2013.01)
(58) Field of Classification Search
  CPC ..... G11B 33/00; G11B 33/022; G11B 33/025
  See application file for complete search history.

(56) References Cited

U.S. PATENT DOCUMENTS

| | | | |
|---|---|---|---|
| 2,561,196 A | 7/1951 | Gauthier | |
| 2,887,918 A | 5/1959 | Benson | |
| 3,644,979 A | 2/1972 | Bura | |
| 4,149,311 A | 4/1979 | Benson et al. | |
| 4,418,458 A | 12/1983 | Hunter | |
| 4,623,156 A | 11/1986 | Moisson et al. | |
| 4,941,841 A * | 7/1990 | Darden | G06F 1/184 361/679.39 |
| 4,967,471 A | 11/1990 | Noguchi et al. | |
| 5,442,513 A * | 8/1995 | Lo | G11B 33/124 361/679.35 |
| 5,886,869 A * | 3/1999 | Fussell | G06F 1/184 360/900 |
| 6,003,851 A | 12/1999 | Araki et al. | |
| 6,051,074 A | 4/2000 | Strodtbeck et al. | |
| 6,124,707 A * | 9/2000 | Kim | G11B 33/08 324/754.08 |
| 6,269,537 B1 | 8/2001 | Kimura et al. | |
| 6,346,038 B1 | 2/2002 | Kajiwara et al. | |
| 6,487,081 B2 * | 11/2002 | Homer | G11B 33/08 312/223.2 |
| 6,571,448 B2 | 6/2003 | Lee et al. | |
| 6,606,242 B2 * | 8/2003 | Goodman | G06F 1/187 248/633 |

(Continued)

OTHER PUBLICATIONS

Non-Final Office Action dated May 28, 2013 from U.S. Appl. No. 12/604,145, 9 pages.

(Continued)

*Primary Examiner* — Minh Trinh

(57) ABSTRACT

A storage device assembly fixture comprises a platform configured to receive an external cover for a storage device, the external cover having a first face and a second face generally parallel to and opposing the first face, the first face coupled to the second face at a back end of the external cover, the first face defining a first edge at a front end of the external cover opposite the back end, and the second face defining a second edge at the front end; a first finger configured to engage the first edge; a second finger configured to engage the second edge; and a pivot assembly coupled to the second finger, the pivot assembly rotatable about a pivot axis and configured to pivot the second finger away from the first finger.

14 Claims, 19 Drawing Sheets

(56) References Cited

U.S. PATENT DOCUMENTS

| | | |
|---|---|---|
| 6,983,527 B2 | 1/2006 | Lanvin |
| 8,149,594 B2 * | 4/2012 | Nishihata ............... H05K 9/002 174/250 |
| 8,707,531 B1 * | 4/2014 | Sungkhaphong ...... G11B 33/00 29/281.1 |
| 2002/0116806 A1 | 8/2002 | Verwold |

OTHER PUBLICATIONS

Final Office Action dated Oct. 8, 2013 from U.S. Appl. No. 12/604,145, 12 pages.

Notice of Allowance dated Dec. 18, 2013 from U.S. Appl. No. 12/604,145, 8 pages.

* cited by examiner

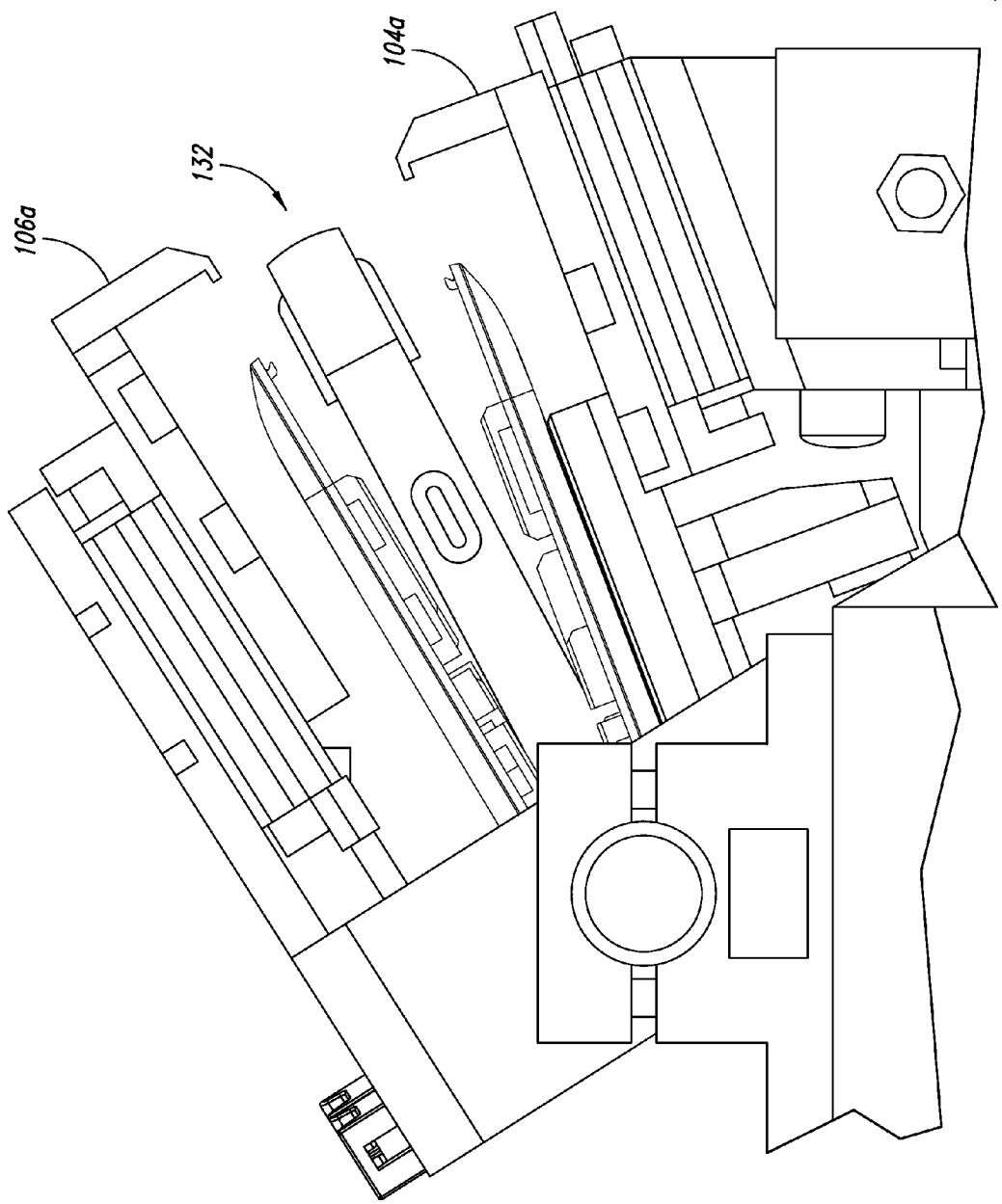

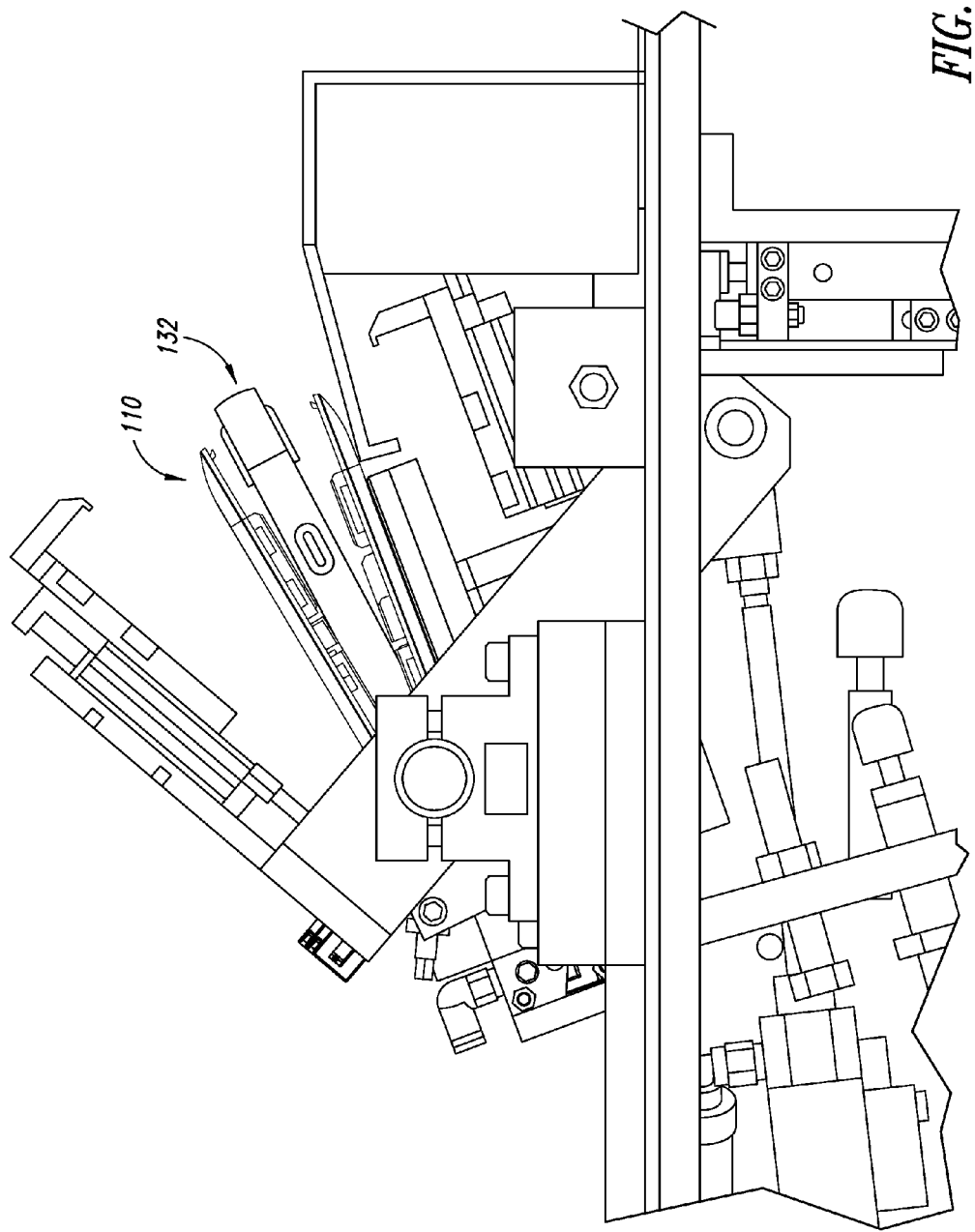

METHOD FOR ASSEMBLING A STORAGE
DEVICE

CROSS REFERENCE TO RELATED
APPLICATIONS

This application is a divisional of U.S. patent application Ser. No. 12/604,145, filed on Oct. 22, 2009, which is hereby incorporated by reference in its entirety.

BACKGROUND

External storage devices typically comprise a storage device packaged within an external cover. The storage device may include any type of digital storage media, such as a conventional disk drive or a solid-state drive, while the external cover provides, inter alia, protection for fragile electronic components, and a desired form factor and design. Often, the storage device and the external cover are manufactured in separate processes and then integrated at a later assembly stage.

In many manufacturing lines, the assembly stage for inserting the storage device within the external cover is manually performed, and significant time and human resources may be employed to accomplish this relatively simple task. As a result, the final assembly becomes a bottleneck in the manufacturing process, limiting overall production and increasing labor costs.

There is therefore a need for an improved fixture for assembling external storage devices.

BRIEF DESCRIPTION OF THE DRAWINGS

FIG. 15 is a side view of the top fingers and the bottom fingers being retracted away from the external cover, according to one illustrated embodiment.

FIG. 16 is a side view of the external cover and the storage device ready for removal from the storage device assembly fixture of FIG. 1, according to one illustrated embodiment.

DETAILED DESCRIPTION

Figure 1:
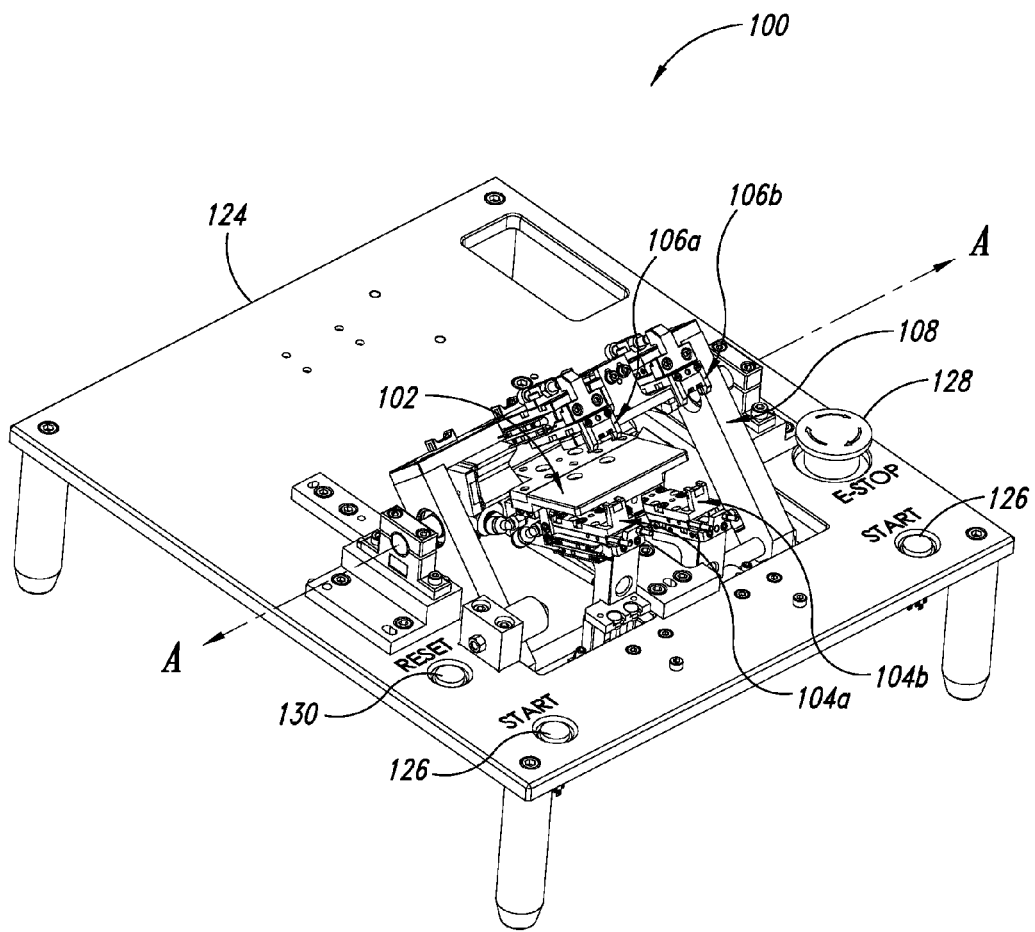
FIG. 1 is a perspective view of a storage device assembly fixture, according to one illustrated embodiment.
Figure 2A:
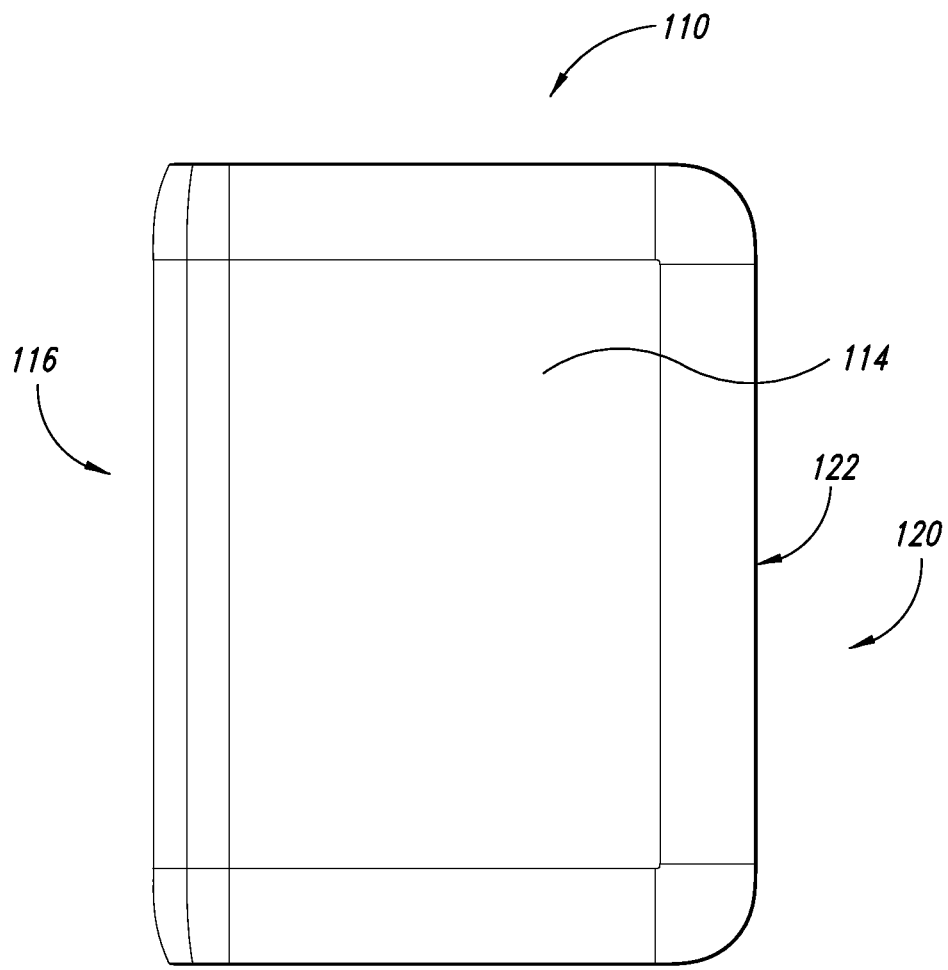
FIG. 2A is a top view of an external cover, according to one illustrated embodiment.
Figure 2B:
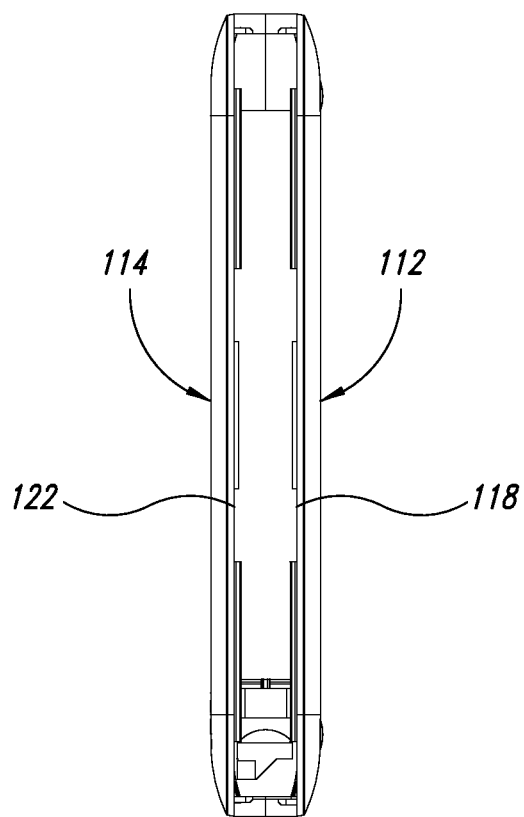
FIG. 2B is a side view of the external cover of FIG. 2A, according to one illustrated embodiment.
Figure 2C:
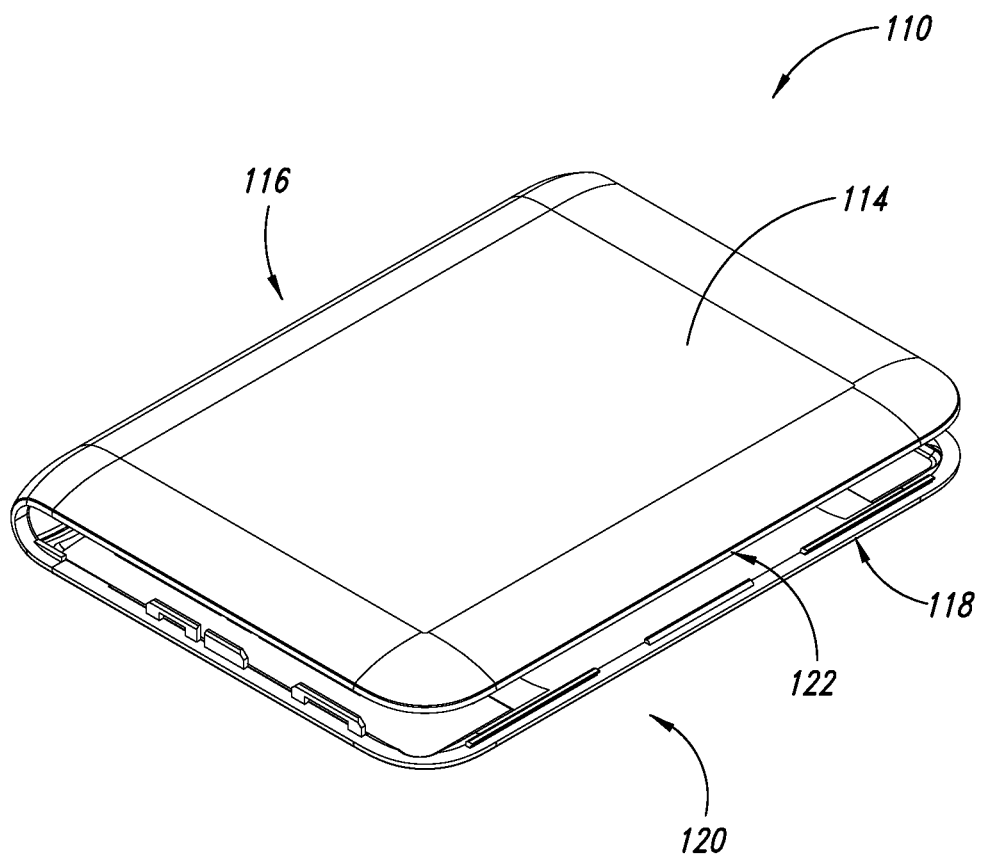
FIG. 2C is a perspective view of the external cover of FIG. 2A, according to one illustrated embodiment.

Referring to FIG. 1, a storage device assembly fixture 100 is illustrated, according to one embodiment. The storage device assembly fixture 100 comprises a platform 102, a first finger 104a, a second finger 106a and a pivot assembly 108. The platform 102 is configured to receive an external cover (not shown in FIG. 1) for a storage device. The external cover 110 is illustrated in FIGS. 2A-C and is discussed in greater detail below. With reference to FIGS. 2A-C, the external cover 110 has a first face 112 and a second face 114 generally parallel to and opposing the first face 114, the first face 112 coupled to the second face 114 at a back end 116 of the external cover 110, the first face 112 defining a first edge 118 at a front end 120 of the external cover 110 opposite the back end 116, and the second face 114 defining a second edge 122 at the front end 120. Returning to FIG. 1, the first finger 104a is configured to engage the first edge 118 of the external cover 110, and the second finger 106a is configured to engage the second edge 122 of the external cover 110. The pivot assembly 108 is coupled to the second finger 106a and is rotatable about a pivot axis A. The pivot assembly 108 is configured to pivot the second finger 106a away from the first finger 104a.

The storage device assembly fixture 100 may comprise any of a variety of assembly fixtures configured to receive an external cover for an external storage device. In one embodiment, the storage device assembly fixture 100 is designed to receive and deform the external cover 110 in order to enable insertion of a storage device. In some embodiments, the storage device assembly fixture 100 comprises one of a number of machines in a manufacturing line. Although illustrated with a single platform 102, the storage device assembly fixture 100 may also be designed to receive more than one external cover 110 at a time. Although different components of the storage device assembly fixture 100 may be made from different materials, in one embodiment, the storage device assembly fixture 100 is primarily made from durable metals (e.g., stainless steel), to maximize the useful life of the machine.

The platform 102 is sized and configured to receive at least a portion of the external cover 110 and may be formed from any of a variety of materials. In one embodiment, the platform 102 may comprise a substantially solid, rectangular, metallic surface upon which at least a portion of the external cover 110 may rest. Of course, the platform 102 may have any of a variety of shapes and sizes and may include one or more holes of varying sizes. In one embodiment, the platform 102 is configured to receive the first face 112 of the external cover 110, and the platform 102 may be larger or smaller than the first face 112. In other embodiments, the platform 102 may be otherwise configured to receive the external cover 110; for example, the platform 102 may be configured to receive the second face 114 of the external cover 110. As illustrated, the platform 102 may be oriented at an angle to a supporting surface (e.g., the ground), such that the external cover 110 may be easily and repeatably positioned thereon. This angle may be varied in different embodiments, and, in some embodiments, the platform 102 may be approximately level with the supporting surface.

The first finger 104a is configured to engage the first edge 118 of the external cover 110. In one embodiment, as illustrated, the first finger 104a is a bottom finger of the storage device assembly fixture 100, and the first face 112 is received by the platform 102. In other embodiments, of course, the first finger 104a may comprise a top or side finger of the storage device assembly fixture 100. The first finger 104a may include a ledge at its end extending at a ninety-degree angle to the rest of the first finger 104a, as illustrated in greater detail in FIG. 6. This ledge may provide better purchase between the first finger 104a and the external cover 110 and may be larger or smaller and extend at different angles relative to the rest of the first finger 104a in different embodiments. Of course, in other embodiments, differently sized and shaped fingers may be used, depending upon the shape, size and orientation of the external cover 110 when positioned within the storage device assembly fixture 100.

The first finger 104a may be formed from a variety of materials. In one embodiment, the first finger 104a is principally formed from metal. The first finger 104a may also include a pliable material along at least a portion of the first finger 104a configured to engage the first edge 118, as illustrated in greater detail in FIG. 6. In one embodiment, this pliable material may comprise a urethane or silicon rubber coating formed along an internal surface of the first finger 104a configured to engage the external cover 110. Other materials and configurations may be used in other embodiments. For example, the first finger 104a may be formed entirely from the more pliable material.

The second finger 106a is configured to engage the second edge 122 of the external cover 110. In one embodiment, as illustrated, the second finger 106a is a top finger of the storage device assembly fixture 100, and the second face 112 is spaced apart from the platform 102. In other embodiments, of course, the second finger 106a may comprise a bottom or side finger of the storage device assembly fixture 100. The second finger 106a may include at least one ledge at its end extending at a ninety-degree angle to the rest of the second finger 106a, as illustrated in greater detail in FIG. 7. Indeed, as illustrated in the Figures, the second finger 106a may include two separate ledges at its end. These ledges may provide better purchase between the second finger 106a and the external cover 110 during rotation and may be larger or smaller and extend at different angles relative to the rest of the second finger 106a in different embodiments. Of course, in other embodiments, differently sized and shaped fingers may be used, depending upon the shape, size and orientation of the external cover 110 when positioned within the storage device assembly fixture 100.

The second finger 106a may be formed from a variety of materials. In one embodiment, the second finger 106a is principally formed from metal. The second finger 106a may also include a pliable material along at least a portion of the second finger 106a configured to engage the second edge 122, as illustrated in greater detail in FIG. 7. In one embodiment, this pliable material may comprise a urethane or silicon rubber coating formed along an internal surface of the second finger 106a configured to engage the external cover 110. Other materials and configurations may be used in other embodiments. For example, the second finger 106a may be formed entirely from the more pliable material.

In some embodiments, the storage device assembly fixture 100 includes additional fingers. The illustrated storage device assembly fixture 100 includes four fingers, and more or fewer fingers may be employed. As illustrated, a third finger 104b may be spaced apart from the first finger 104a and configured to engage the first edge 118, and a fourth finger 106b may be spaced apart from the second finger 106a and configured to engage the second edge 122. In some embodiments, the third finger 104b may be configured generally similarly to the first finger 104a, although, in other embodiments, they may be configured quite differently. Similarly, the fourth finger 106b may be configured generally similarly to the third finger 106a, although, in other embodiments, they may be configured differently. As described in greater detail below, each of the fingers 104a, 104b, 106a, 106b may be independently moveable to provide flexible control of the storage device assembly fixture 100. Of course, in other embodiments, the movement of one or more of these fingers 104a, 104b, 106a, 106b may be coupled.

The pivot assembly 108 is coupled to the second finger 106a and is rotatable about the pivot axis A. In one embodiment, the pivot assembly 108 includes one or more shafts that define the pivot axis A. In other embodiments, other configurations may be used in order to enable the pivoting action of the pivot assembly 108. The pivot assembly 108 may be configured to pivot the second finger 106a away from the first finger 104a during operation, thus moving the second edge 122 of the external cover 110 away from the first edge 118 of the external cover 110. Once the edges 118, 122 and the respective faces 112, 114 have been separated, a storage device may be inserted within the external cover 110, and the assembly process may be completed. It may be seen that the rotation of the pivot assembly 108 is particularly well-suited to spreading an external cover 110 that is shaped generally like a book, as described in greater detail below.

In one embodiment, the storage device assembly fixture 100 further includes a table 124 that serves as a base for supporting the other components. The table 124 may comprise a metallic base positioned such that it is easily accessible by an operator.

In some embodiments, operation of the storage device assembly fixture 100 may be substantially automated. The storage device assembly fixture 100 may include a programmable logic controller (PLC) (not shown) configured to control movement of the second finger 106a. This same PLC may also be used to control other actuators configured to move different components within the storage device assembly fixture 100 and may be coupled to and responsive to one or more sensors positioned at various locations in the storage device assembly fixture 100. In other embodiments, different electronic circuitry may be included to control the storage device assembly fixture 100.

In one embodiment, the PLC may be coupled to another computing device that may control the storage device assembly fixture 100 via the PLC in accordance with a manufacturing algorithm. As illustrated, the storage device assembly fixture 100 may also, or alternatively, include a physical interface for controlling the operation of the storage device assembly fixture 100. This physical interface may include a plurality of buttons, such as, start buttons 126, an emergency stop button 128, and a reset button 130. Of course, in other embodiments, a different physical interface (associated with the same or different functions) may be implemented. Moreover, some or all of the functionality of this physical interface may instead be implemented in computer code executed by a computing device coupled to the PLC.

FIGS. 2A-2C show top, side and perspective views of the external cover 110. In one embodiment, the external cover 110 is sized and configured to engage and at least partially surround a storage device. As illustrated, the external cover 110 may be shaped generally like a book having three sides, including the first face 112 and the second face 114 generally parallel to and opposing the first face 112. Different indents and protrusions may be formed along the inside surfaces of the external cover 110 (as illustrated) in order to produce a tight, mating fit between the storage device and the external cover 110. In other embodiments, of course, the external cover 110 may be differently configured. The external cover 110 may serve a number of different purposes. In one embodiment, the external cover 110 may partially protect the storage device from impacts and may provide aesthetic appeal. Meanwhile, portions of a storage device positioned within the external cover 110 may be exposed through the external cover 110 in order to facilitate communication between an external computing device and the storage device.

In one embodiment, the external cover 110 comprises a deformable thermoplastic, which may be formed by any of a variety of manufacturing methods. For example, the external cover 110 may be molded to form the shape illustrated in FIGS. 2A-2C, or the external cover 110 may be assembled from smaller molded parts. In other embodiments, the external cover 110 may comprise other materials, such as other plastics or metals.

Figure 3:
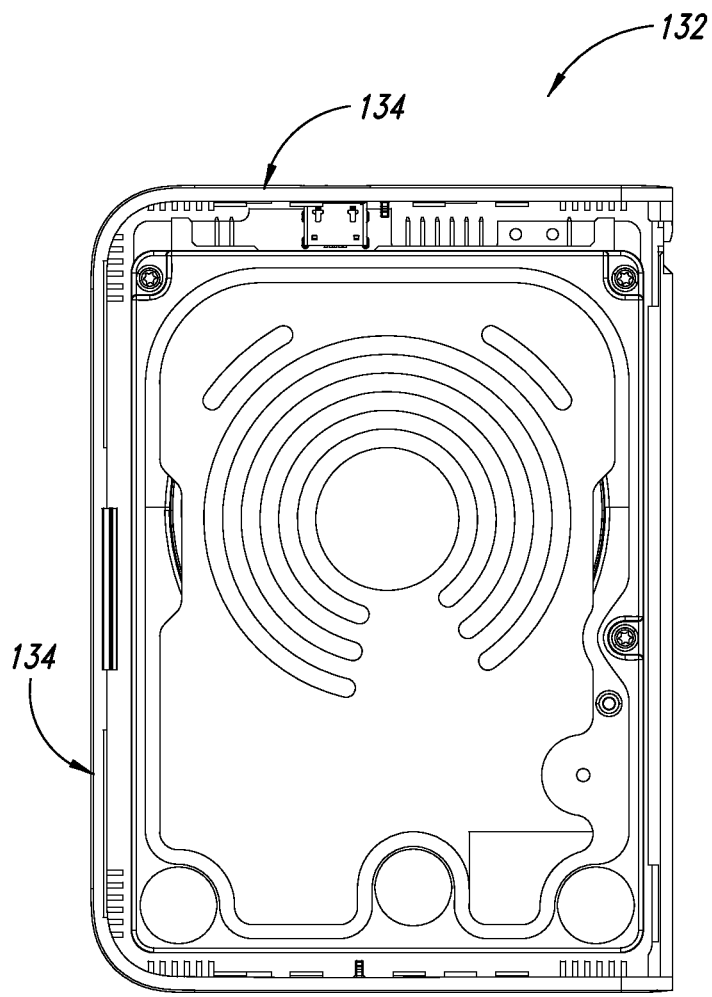
FIG. 3 is a top view of a storage device, according to one illustrated embodiment.

FIG. 3 illustrates an example storage device 132 that may be inserted at least partially within the external cover 110. In one embodiment, the storage device 132 may comprise a disk drive utilizing rotating storage media. In another embodiment, the storage device 132 may use solid state storage media, such as flash memory. In still other embodiments, other digital media may be employed within the storage device 132. In some embodiments, the storage device 132 includes circuitry and interfaces designed for external communication with a computing device; however, in other embodiments, one or more separate components may provide the interface between the storage device 132 and a computing device.

The storage device 132 may have any of a variety of shapes and sizes. In some embodiments, conventional disk drive form factors (e.g., 5¼", 3½", 2½" or 1") may be used. The storage device 132 may also include different indents and protrusions in order to produce a tight, mating fit between the storage device 132 and the external cover 110. As illustrated, the storage device 132 may further include a more rugged protective layer 134 extending along at least a section of the storage device 132. In one embodiment, this protective layer 134 may remain exposed once the storage device 132 has been inserted within the external cover 110 and may thus provide some of the protective/aesthetic qualities also provided by the external cover 110.

Figure 4:
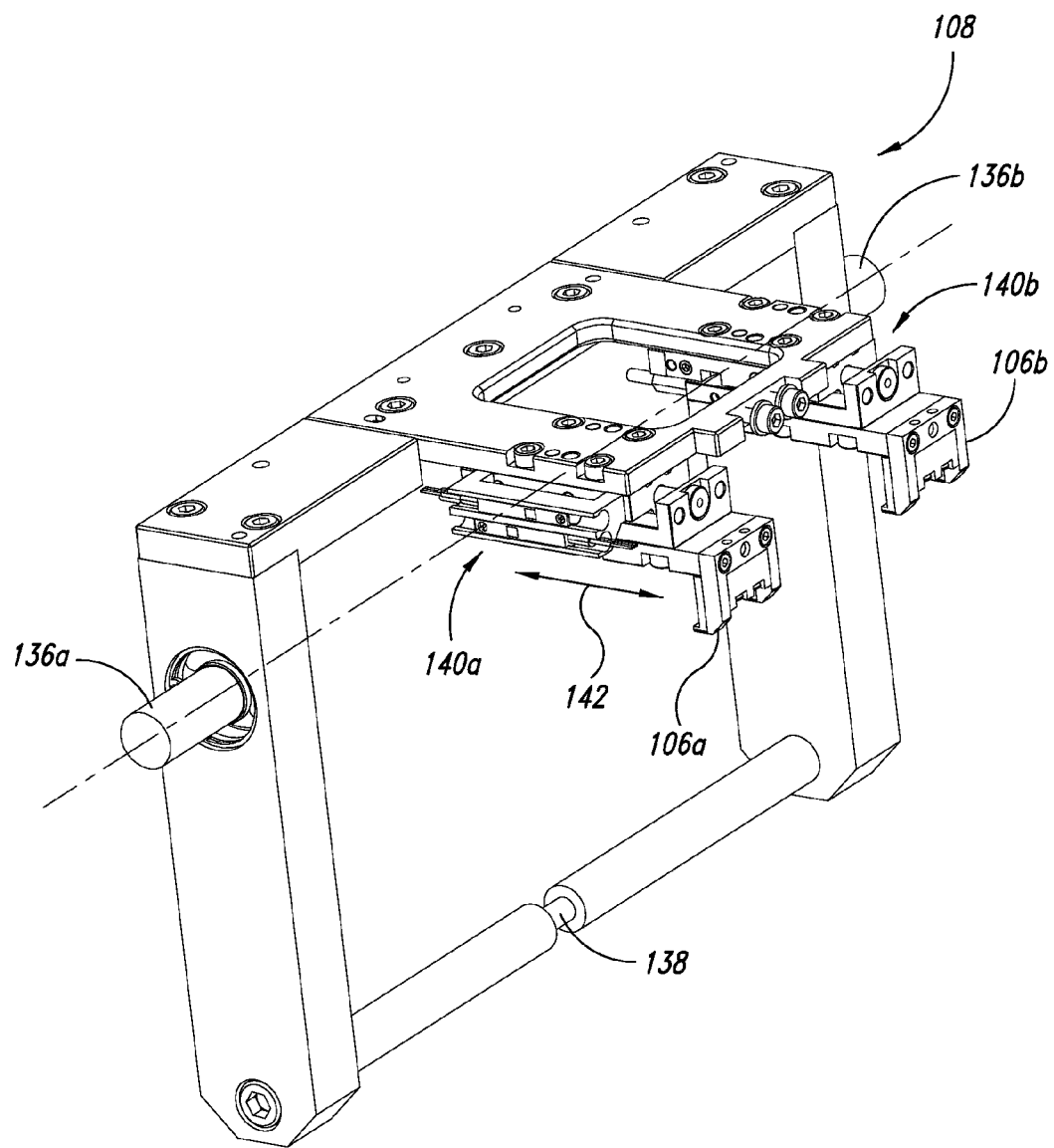
FIG. 4 is a perspective view of a pivot assembly of the storage device assembly fixture of FIG. 1, according to one illustrated embodiment.

FIG. 4 illustrates the pivot assembly 108 of the storage device assembly fixture 100 in greater detail. In one embodiment, a pair of concentric shafts 136a, 136b defines the pivot axis A about which the pivot assembly 108 is configured to rotate. These shafts 136a, b may be received within corresponding recesses in the storage device assembly fixture 100 and allowed to spin freely therein. In other embodiments, more or fewer shafts 136a, b or different configurations may be used in order to enable the pivoting action of the pivot assembly 108.

In one embodiment, the storage device assembly fixture 100 includes a linear actuator (not shown) moveable in engagement with the pivot assembly 108 and configured to cause the pivot assembly 108 to pivot the second finger 106a away from the first finger 104a. As illustrated in FIG. 4, the pivot assembly 108 may include a bar 138 distanced radially from the shafts 136a, b. This bar 138 may be engaged by the linear actuator in order to pivot the pivot assembly 108. In one embodiment, the bar 138 is metallic. In other embodiments, other relatively stiff materials may be used. Of course, in still other embodiments, other structures or configurations may be employed in order to cause the pivot assembly 108 to rotate about the pivot axis A.

FIG. 4 also illustrates the second and fourth fingers 106a, 106b in greater detail. In one embodiment, the second finger 106a is coupled to a second finger actuator 140a coupled to the pivot assembly 108. When the external cover 110 is loaded in the storage device assembly fixture 100, the second finger actuator 140a is configured to move the second finger 106a along a second plane extending generally parallel with the second face 114 between a second disengaged position apart from the second edge 122 and a second engaged position adjacent the second edge 122. The direction of movement of the second finger actuator 140a is illustrated by the axis 142. In one embodiment, the fourth finger 106b may also be coupled to a fourth finger actuator 140b configured to move independently from the second finger actuator 140a and coupled to the pivot assembly 108. The fourth finger actuator 140b is configured to move the fourth finger 106b along the second plane between a fourth disengaged position apart from the second edge 122 and a fourth engaged position adjacent the second edge 122. Thus, in one embodiment, the second and fourth fingers 106a, 106b may be independently moveable along the axis 142. This may enable the storage device assembly fixture 100 to accommodate the external cover 110, even when the second edge 122 is not perfectly aligned within the storage device assembly fixture 100.

In some embodiments, the second finger actuator 140a may be further configured to apply a bias force pushing the second finger 106a against the second edge 122 while the pivot assembly 108 rotates. As the pivot assembly 108 rotates, the external cover 110 is spread apart, and the second face 114 may slightly deform. By applying a bias force to push the second finger 106a against the second edge 122, the second finger 106a may be kept in constant contact with the second edge 122 even as the material of the second face 114 deforms. In some embodiments, the fourth finger actuator 140b may be similarly configured to apply a bias force pushing the fourth finger 106b against the second edge 122 while the pivot assembly 108 rotates.

The second and fourth finger actuators 140a, b may include any of a variety of motors. In one embodiment, the second and fourth finger actuators 140a, b may comprise electrical/electromechanical motors. In other embodiments, the second and fourth finger actuators 140a, b may include hydraulic motors. In one embodiment, the second finger actuator 140a is configured to generate the bias force by air pressure. Of course, in other embodiments, other structures may be used.

Figure 5:
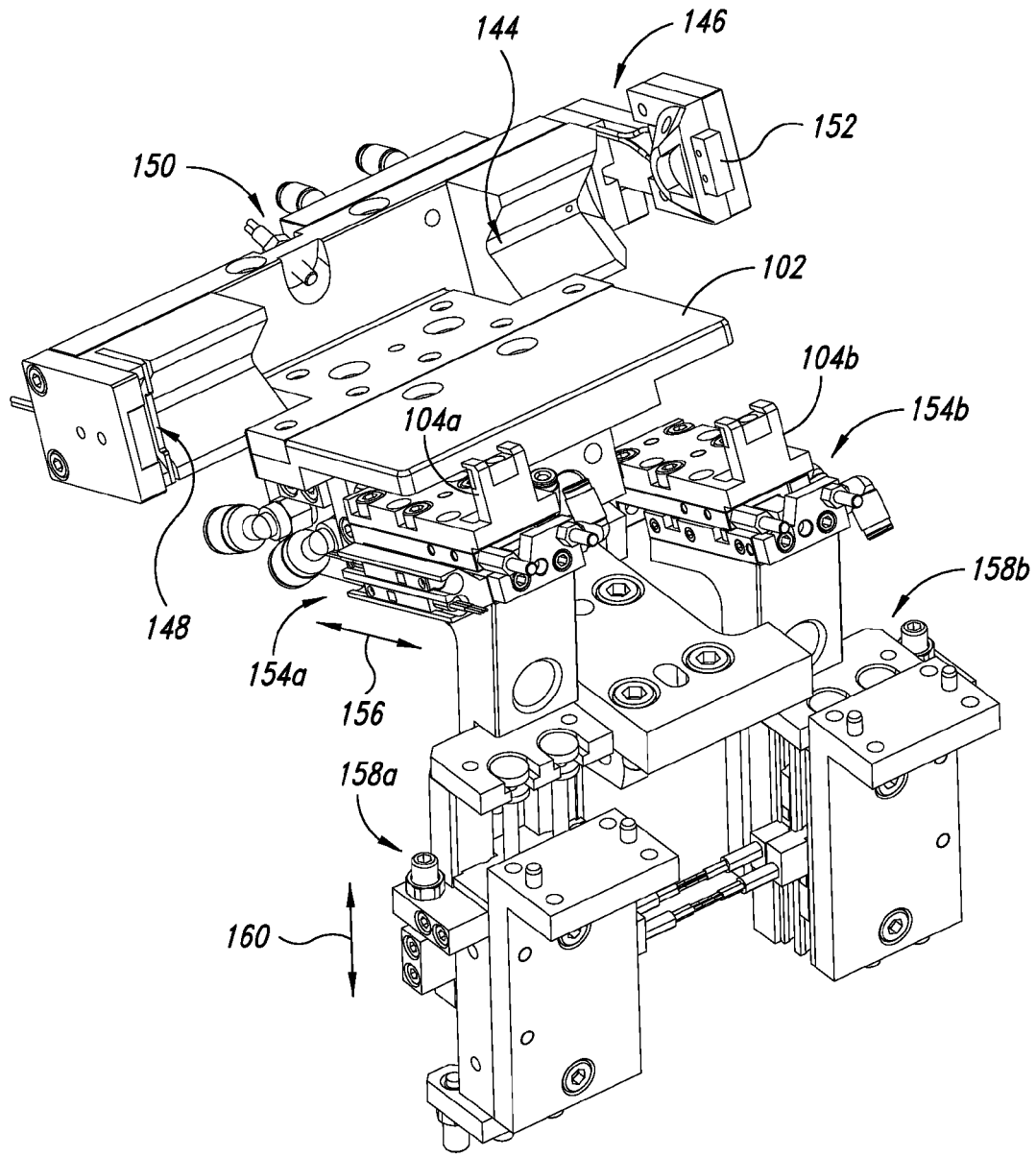
FIG. 5 is a perspective view of a lower portion of the storage device assembly fixture of FIG. 1, according to one illustrated embodiment.

FIG. 5 illustrates a bottom portion of the storage device assembly fixture 100 in greater detail. As illustrated, the storage device assembly fixture 100 may include a nest 144 configured to receive the back end 116 of the external cover 110. When the external cover 110 is properly seated within the storage device assembly fixture 100, the first face 112 may be positioned on the platform 102, and the back end 116 of the external cover 110 may be positioned against the nest 144. The nest 144 may have a variety of shapes and sizes. In one embodiment, the nest 144 may be generally concave in order to easily and securely receive the back end 116.

The storage device assembly fixture 100 may further comprise a bias actuator 146 coupled to a side of the nest 144 and configured to exert a bias force against at least one side edge of the external cover 110 extending between the back end 116 and the front end 120 in order to position the external cover 110. The bias actuator 146 may push the external cover 110 against the opposite wall 148, in order to repeatably and precisely position the external cover 110 within the storage device assembly fixture 100. The bias actuator 146 may include any of a variety of motors, such as electrical/electromechanical motors or hydraulic motors.

In some embodiments, the nest 144 includes at least one sensor in order to facilitate the automated operation of the storage device assembly fixture 100. In one embodiment, the nest 144 includes a cover loaded sensor 150 configured to detect the external cover 110 positioned against the nest 144. As illustrated, the cover loaded sensor 150 may comprise an optical sensor positioned near a rear of the storage device assembly fixture 100. In other embodiments, other types of sensors may be deployed in other positions within the storage device assembly fixture 100 in order to detect the external cover 110 positioned against the nest 144.

In another embodiment, the nest 144 includes a storage device loaded sensor 152 configured to detect the storage device 132 positioned within the external cover 110. This storage device loaded sensor 152 may comprise an optical sensor positioned adjacent the bias actuator 146. In other embodiments, other types of sensors may be deployed in other positions in order to detect the storage device 132 positioned within the external cover 110. As described above, a PLC may be coupled to these sensors 150, 152 and may control the storage device assembly fixture 100 based upon electrical signals received therefrom.

As illustrated in FIG. 5, the first finger 104a may be coupled to a first finger actuator 154a. When the external cover 110 is loaded in the storage device assembly fixture 100, the first finger actuator 154a may be configured to move the first finger 104a along a first plane extending generally parallel with the first face 112 between a first disengaged position apart from the first edge 118 and a first engaged position adjacent the first edge 118. The direction of movement of the first finger actuator 154a is illustrated by the axis 156. In one embodiment, the third finger 104b may be coupled to a third finger actuator 154b configured to move independently from the first finger actuator 154a. The third finger actuator 154b is configured to move the third finger 104b along the first plane between a third disengaged position apart from the first edge 118 and a third engaged position adjacent the first edge 118. Thus, in one embodiment, the first and third fingers 104a, 104b may be independently moveable along the axis 156. This may enable the storage device assembly fixture 100 to accommodate the external cover 110, even when the first edge 118 is not perfectly aligned within the storage device assembly fixture 100.

The first and third finger actuators 154a, b may include any of a variety of motors. In one embodiment, the first and third finger actuators 154a, b may comprise electrical/electromechanical motors. In other embodiments, the first and third finger actuators 154a, b may include hydraulic motors.

The storage device assembly fixture 100 may further include a first elevator actuator 158a coupled to the first finger 104a. The first elevator actuator 158a may be configured to move the first finger 104a from an unaligned position wherein no portion of the first finger 104a extends between first and second planes extending generally parallel with the first and second faces 112, 114, respectively, to an aligned position wherein at least some portion of the first finger 104a extends between the first and second planes. In other words, the first elevator actuator 158a may be configured to move the first finger 104a along the axis 160. In one embodiment, the third finger 104b may be coupled to a third elevator actuator 158b configured to move independently from the first elevator actuator 158a. The third elevator actuator 158b may be configured to move the third finger 104b from an unaligned position wherein no portion of the third finger 104b extends between first and second planes extending generally parallel with the first and second faces 112, 114, respectively, to an aligned position wherein at least some portion of the third finger 104b extends between the first and second planes.

The first and third elevator actuators 158a, b may include any of a variety of motors. In one embodiment, the first and third elevator actuators 158a, b may comprise electrical/electromechanical motors. In other embodiments, the first and third elevator actuators 158a, b may include hydraulic motors.

Figure 6:
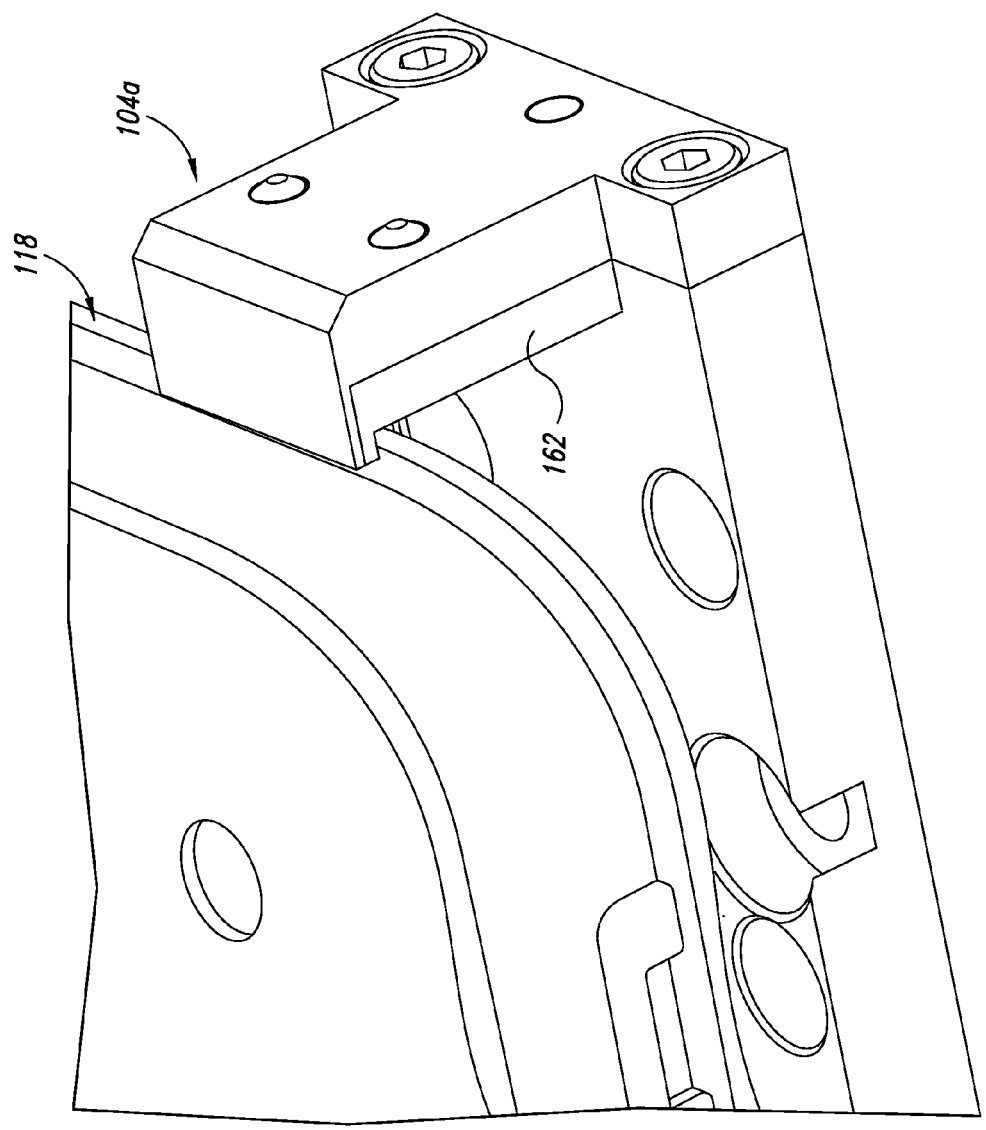
FIG. 6 is an enlarged, perspective view of a bottom finger of the storage device assembly fixture of FIG. 1 about to engage the external cover, according to one illustrated embodiment.

FIG. 6 is a magnified view of the first finger 104a about to engage the first edge 118 of the external cover 110. A pliable material 162 is shown along at least a portion of the first finger 104a configured to engage the first edge 118. The pliable material 162 may be adhered to an interior surface of the first finger 104a or may be otherwise affixed thereto. This pliable material 162 may enable superior engagement between the first finger 104a and the external cover 110, and may also prevent the first finger 104a from scuffing, scratching or otherwise marring the external cover 110 during the assembly process.

Figure 7:
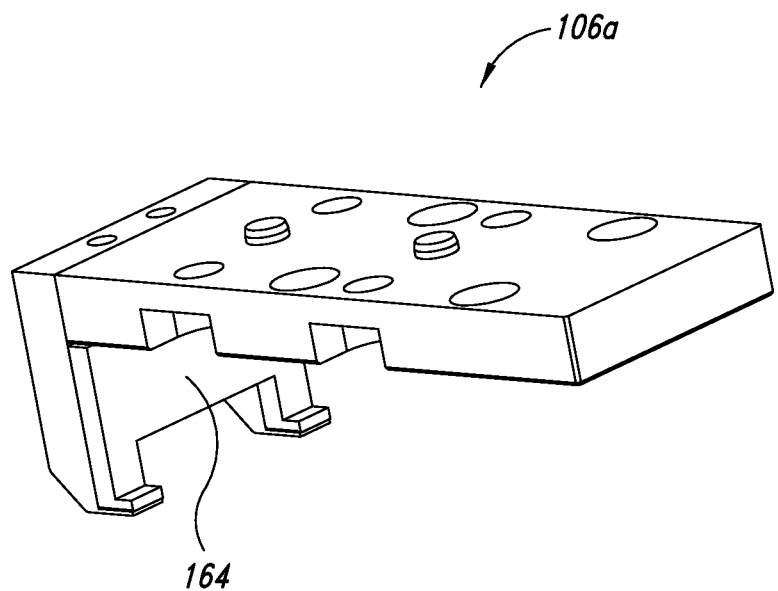
FIG. 7 is an enlarged, perspective view of a top finger of the storage device assembly fixture of FIG. 1, according to one illustrated embodiment.

FIG. 7 is a magnified view of the second finger 106a. A pliable material 164 is shown along at least a portion of the second finger 106a configured to engage the second edge 122. The pliable material 164 may be adhered to an interior surface of the second finger 106a or may be otherwise affixed thereto. This pliable material 164 may enable superior engagement between the second finger 106a and the external cover 110, and may also prevent the second finger 106a from scuffing, scratching or otherwise marring the external cover 110 during the assembly process.

Figure 8:
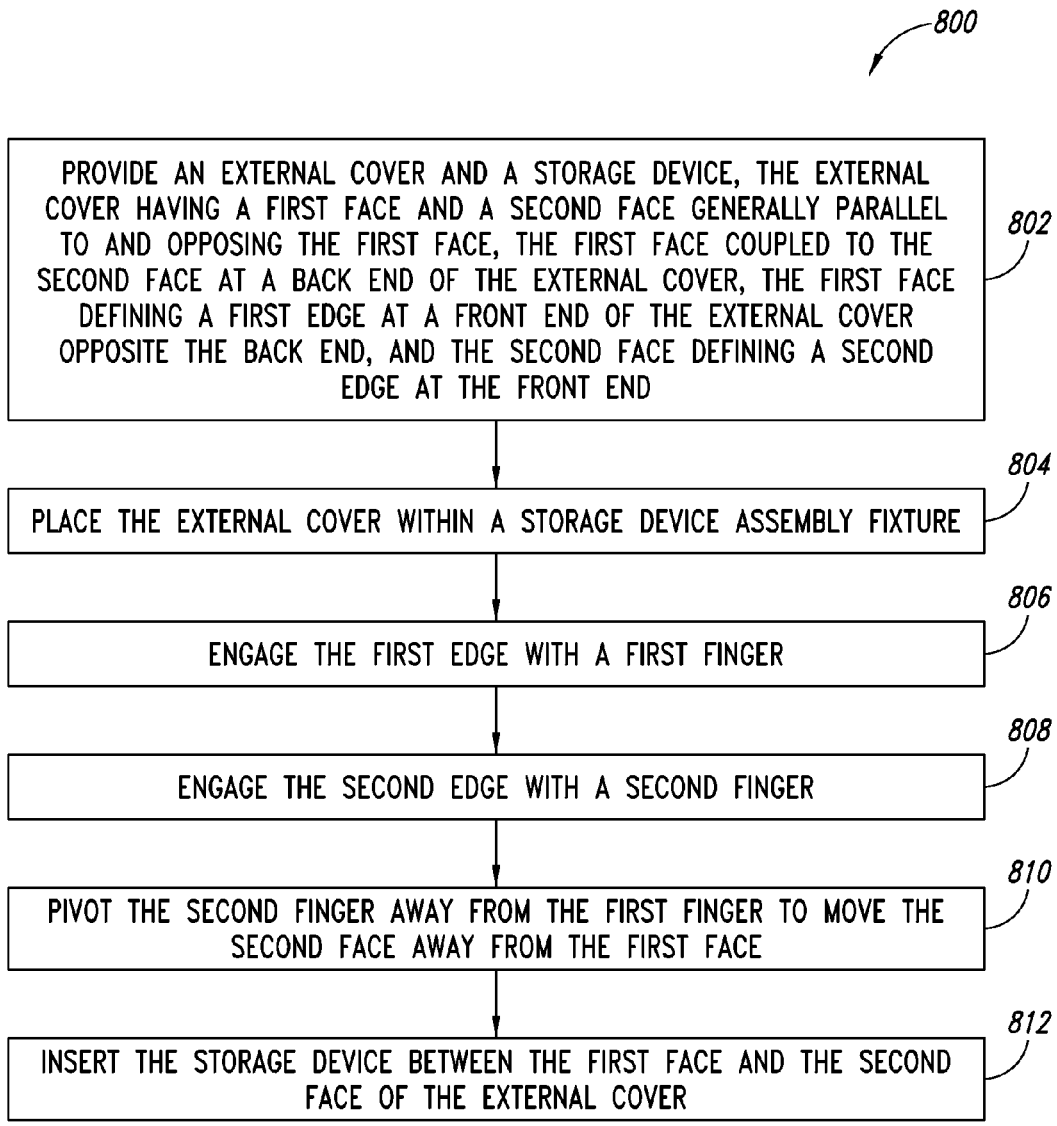
FIG. 8 illustrates a flow chart for a method of assembling an external storage device, according to one illustrated embodiment.

FIG. 8 illustrates a flow chart for a method 800 of assembling an external storage device, according to one illustrated embodiment. This method 800 will be discussed in the context of the storage device assembly fixture 100 of FIGS. 1-7, and will be described with reference to FIGS. 9-16. However, the acts disclosed herein may be executed using any of a variety of assembly fixtures, in accordance with the described method.

As described herein, at least some of the acts comprising the method 800 may be orchestrated by a processor according to an automatic manufacturing algorithm, based at least in part on computer-readable instructions stored in computer-readable memory and executable by the processor. A manual implementation of one or more acts of the method 800 may also be employed, in other embodiments.

At act 802, an external cover 110 and a storage device 132 are provided, the external cover 110 having a first face 112 and a second face 114 generally parallel to and opposing the first face 112, the first face 112 coupled to the second face 114 at a back end 116 of the external cover 110, the first face 112 defining a first edge 118 at a front end 120 of the external cover 110 opposite the back end 116, and the second face 114 defining a second edge 122 at the front end 120. The external cover 110 and the storage device 132 may be provided in a variety of ways. In one embodiment, the external cover 110 comprises a molded thermoplastic, and the storage device 132 comprises any of a variety of digital storage media.

Figure 9:
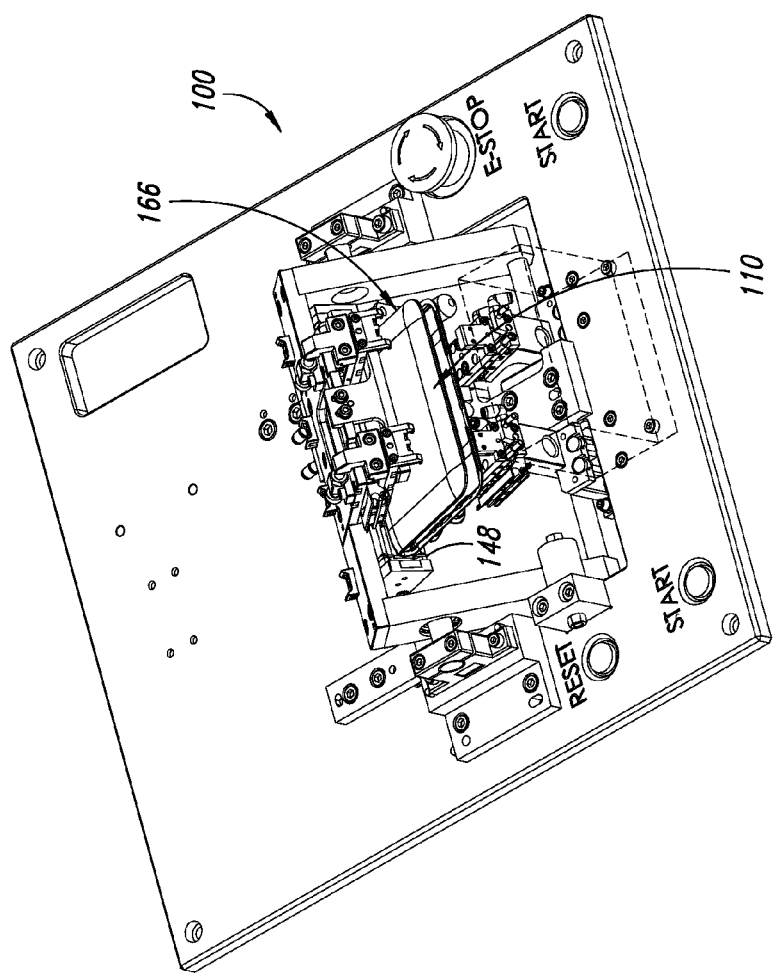
FIG. 9 is a perspective view of the storage device assembly fixture of FIG. 1 with an external cover inserted therein, according to one illustrated embodiment.

At act 804, the external cover 110 is placed within a storage device assembly fixture 100, as illustrated in FIG. 9. In one embodiment, the external cover 110 is placed within the storage device assembly fixture 100 using a robotic arm. However, in other embodiments, a human operator may place the external cover 110 within the storage device assembly fixture 100.

The external cover 110 may be placed within the storage device assembly fixture 100 in a variety of orientations. In one embodiment, the first face 112 of the external cover 110 is placed against a platform 102 of the storage device assembly fixture 100. In other embodiments, the second face 114 of the external cover 110 may be placed against the platform 102. In still other embodiments, the storage device assembly fixture 100 may not include a platform.

When placing the external cover 110 within the storage device assembly fixture 100, the back end 116 of the external cover 110 may be positioned against a nest 144 near the platform 102. This positioning may enable more precise and repeatable orientation of the external cover 110 within the storage device assembly fixture 100. In some embodiments, a bias force may then be exerted against at least one side edge 166 of the external cover 110 extending between the back end 116 and the front end 120 in order to position the external cover 110 before engaging the first edge 118 with the first finger 104*a* and the second edge 122 with the second finger 106*a*. As described in greater detail above, this bias force may be exerted by a bias actuator 146 (see FIG. 5). The bias actuator 146 may push the external cover 110 against the opposite wall 148, in order to repeatably and precisely position the external cover 110 within the storage device assembly fixture 100.

In one embodiment, the storage device assembly fixture 100 may automatically detect the external cover 110 positioned against the nest 144. For example, a cover loaded sensor 150 may be used to detect when the external cover 110 has been properly positioned against the nest 144. The bias force may then be exerted on the external cover 110 based at least in part on the detection. This algorithm may, in some embodiments, be controlled via a PLC coupled to both the cover loaded sensor 150 and the bias actuator 146.

At act 806, the first edge 118 is engaged with a first finger 104*a*. At act 808, the second edge 122 is engaged with a second finger 106*a*. In some embodiments, these acts are executed substantially simultaneously. However, in other embodiments, they may be executed at separate times in the assembly process.

Figure 10B:
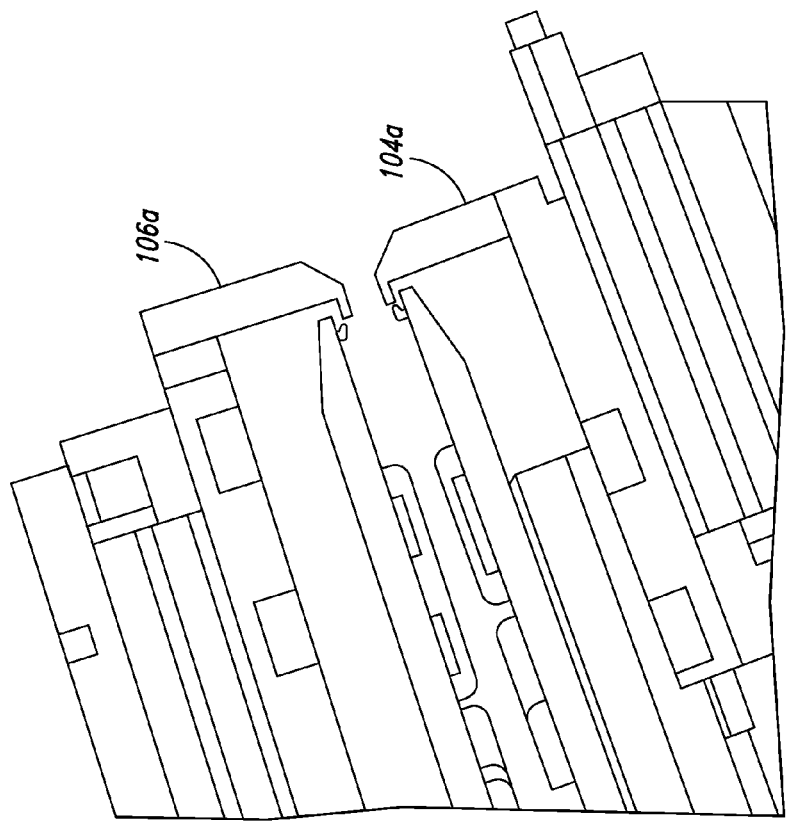
FIG. 10B is an enlarged side view of the storage device assembly fixture of FIG. 1 as the top and bottom fingers engage the external cover, according to one illustrated embodiment.
Figure 10A:
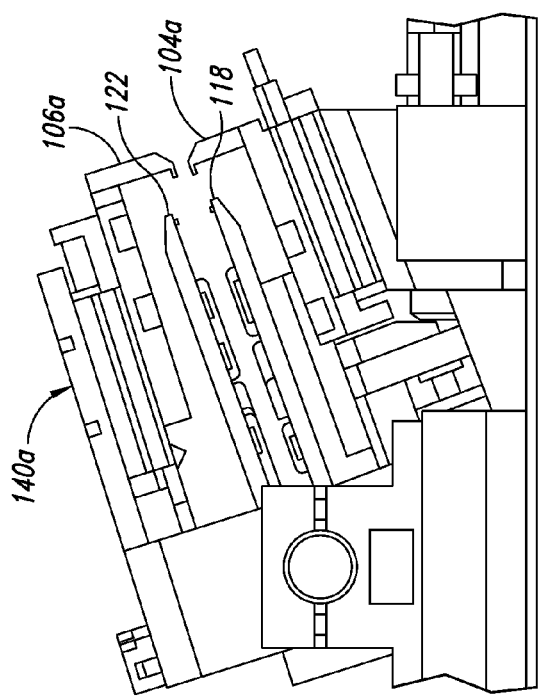
FIG. 10A is a side view of the storage device assembly fixture of FIG. 1 before the top and bottom fingers engage the external cover, according to one illustrated embodiment.

As schematically illustrated in FIGS. 10A and 10B, the act of engaging the first edge 118 with the first finger 104*a* may include movement of the first finger 104*a* along a few different axes. In one embodiment, the first finger 104*a* may initially be moved along the axis 160 until at least some portion of the first finger 104*a* extends between first and second planes extending generally parallel with the first and second faces 112, 114, respectively. This position is illustrated in FIG. 10A. The first finger 104*a* may then be moved along the first plane into engagement with the first edge 118, as illustrated in FIG. 10B. As described above, the first finger 104*a* may be moved along the axis 160 using the first elevator actuator 158*a*, while the first finger 104*a* may be moved along the first plane using the first finger actuator 154*a*. Each of these actuators 154*a*, 158*a* may be controlled by a PLC. Of course, in other embodiments, different systems of actuators and other movement paradigms may be used in order to engage the first edge 118 with the first finger 104*a*. The third finger 104*b* may be similarly moved into engagement with the first edge 118.

In one embodiment, engaging the second edge 122 with the second finger 106*a* may further include pivoting the second finger 106*a* until at least some portion of the second finger 106*a* extends between first and second planes extending generally parallel with the first and second faces 112, 114, respectively. This position is illustrated in FIG. 10A. The second finger 106*a* may then be moved along the second plane into engagement with the second edge 122, as illustrated in FIG. 10B. As described above, the second finger 106*a* may be pivoted via rotation of the pivot assembly 108, while the second finger 106*a* may be moved along the second plane using the second finger actuator 140*a*. Of course, in other embodiments, different systems of actuators and other movement paradigms may be used in order to engage the second edge 122 with the second finger 106*a*. The fourth finger 106*b* may be similarly moved into engagement with the second edge 122.

In one embodiment, a bias force is applied to push the second finger 106*a* against the second edge 122. The second finger 106*a* may thus move radially away from or towards a pivot axis A about which the second finger 106*a* pivots while the second finger 106*a* pivots away from the first finger 104*a* to move the second face 114 away from the first face 112. In one embodiment, the bias force may be generated by air pressure, although other structures for generating the bias force may be used in other embodiments.

Figure 11:
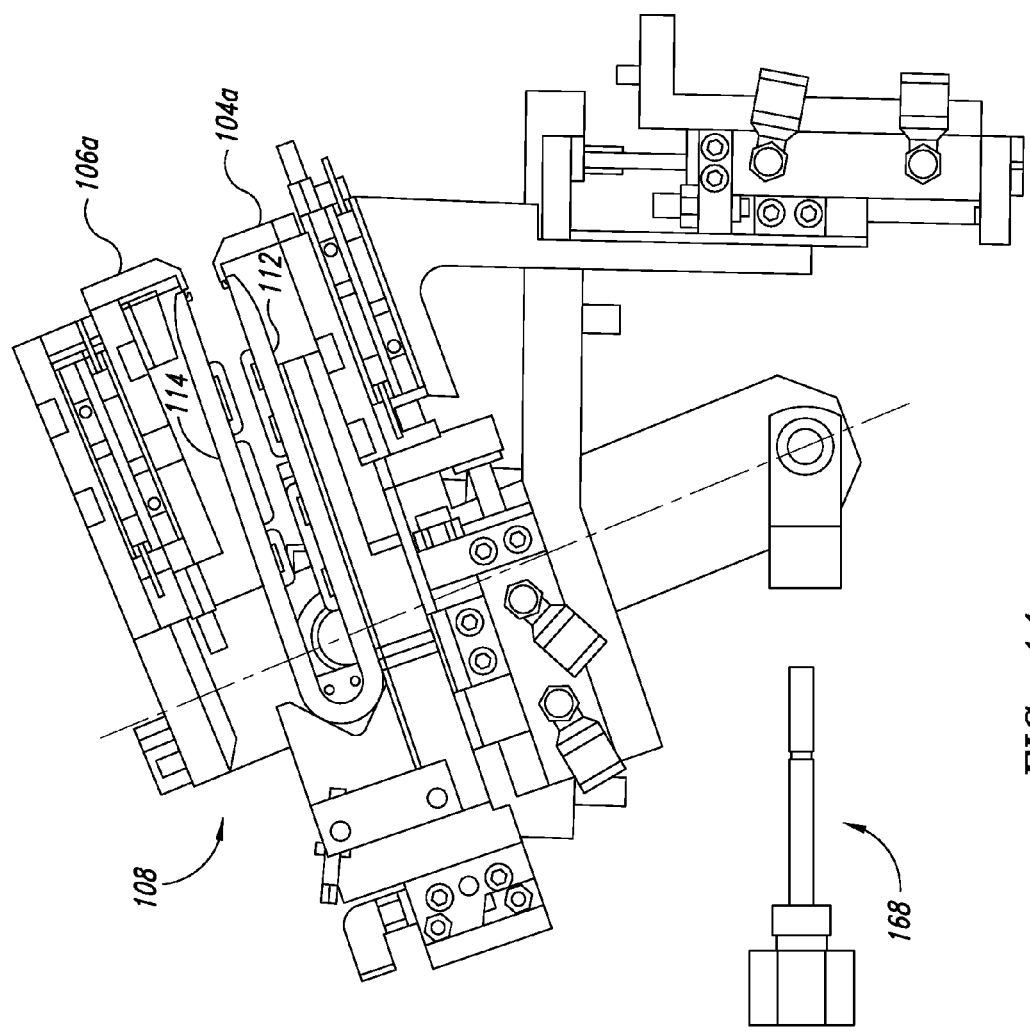
FIG. 11 is a side view of the storage device assembly fixture of FIG. 1 before the top fingers are pivoted away from the bottom fingers, according to one illustrated embodiment.

At act 810, the second finger 106*a* is pivoted away from the first finger 104*a* to move the second face 114 away from the first face 112. The second finger 106*a* may be pivoted away from the first finger 104*a* by any of a variety of structures. In one embodiment, as illustrated in FIG. 11, the second finger 106*a* may be coupled to a pivot assembly 108, and a linear actuator 168 may be actuated to engage the pivot assembly 108. Movement of the linear actuator 168 and the resultant pivoting of the pivot assembly 108 is illustrated in FIGS. 11 and 12.

Figure 12:
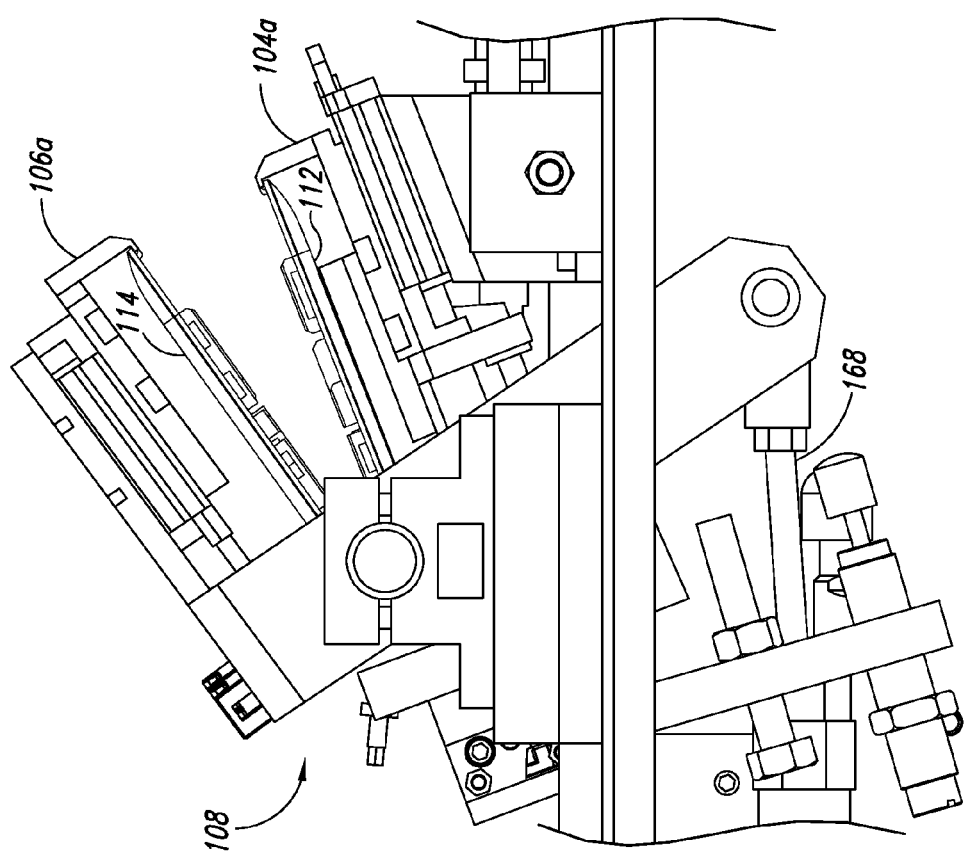
FIG. 12 is a side view of the storage device assembly fixture of FIG. 1 showing the top fingers pivoted away from the bottom fingers, according to one illustrated embodiment.

In one embodiment, the second finger 106*a* is pivoted away from the first finger 104*a* such that the second face 114 forms approximately a thirty degree angle to the first face 112, as illustrated in FIG. 12. This angle may allow insertion of the storage device 132 without excessive deformation of the external cover 110. In other embodiments, smaller or larger angles may be formed between the first and second faces 112, 114, based upon the corresponding geometries of the external cover 110 and the storage device 132.

Figure 13A:
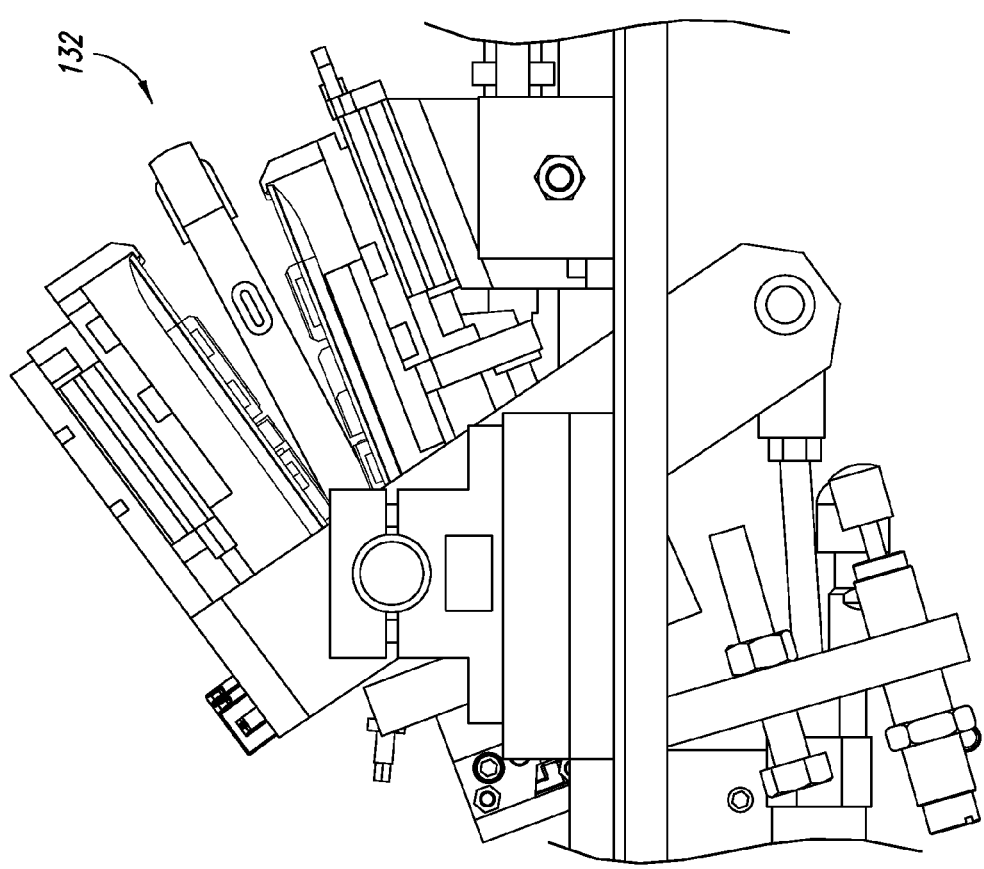
FIG. 13A is a side view of a storage device being inserted within the external cover, according to one illustrated embodiment.
Figure 13B:
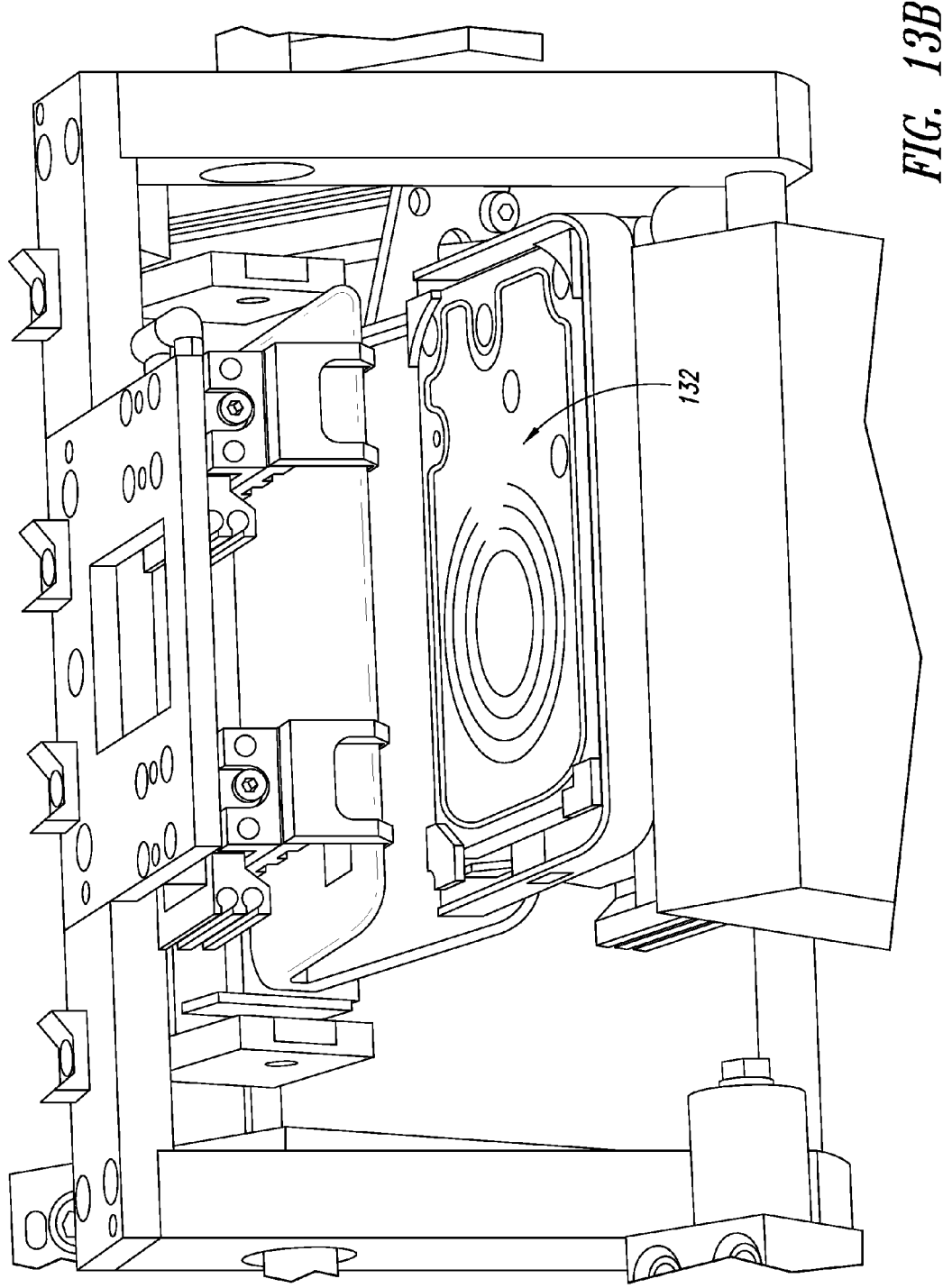
FIG. 13B is a perspective view of the storage device being inserted within the external cover, according to one illustrated embodiment.

At act 812, the storage device 132 is inserted between the first face 112 and the second face 114 of the external cover 110, as illustrated in FIGS. 13A and 13B. In one embodiment, the storage device 132 is inserted within the external cover 110 using a robotic arm. However, in other embodiments, a human operator may place the storage device 132 within the external cover 110.

Figure 14:
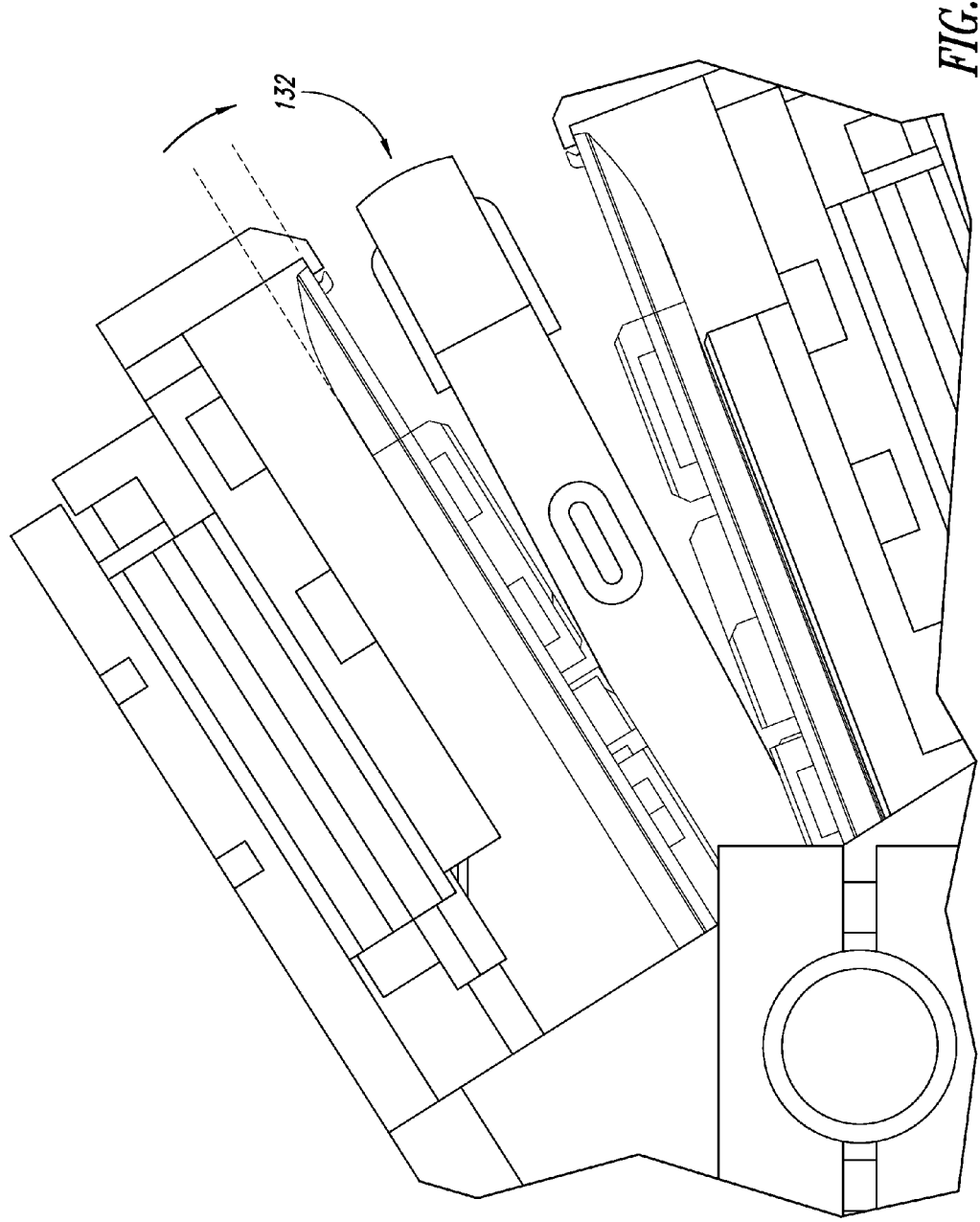
FIG. 14 is an enlarged side view of the top fingers being pivoted back towards the bottom fingers after insertion of the storage device, according to one illustrated embodiment.

In one embodiment, after inserting the storage device 132, the second finger 106*a* may be pivoted between approximately five and ten degrees back towards the first finger 104*a*, as illustrated in FIG. 14. In other embodiments, the second finger 106*a* may be pivoted by a greater or lesser angle back towards the first finger 104*a*. This reduction in the angle between the first face 112 and the second face 114 may enable a controlled relaxation of the external cover 110 before the external cover 110 is allowed to snap shut about the storage device 132.

In one embodiment, the storage device assembly fixture 100 may automatically detect insertion of the storage device 132. For example, a storage device loaded sensor 152 (not shown in FIGS. 13-16) may be used to detect when the storage device 132 has been properly positioned within the external cover 110. The second finger 106a may then be pivoted back towards the first finger 104a based at least in part on the detection. This algorithm may, in some embodiments, be controlled via a PLC coupled to both the storage device loaded sensor 134 and the linear actuator 168.

After pivoting the second finger 106a back towards the first finger 104a, the second finger 106a may be retracted from the second edge 122. This may allow the second face 114 of the external cover 110 to relax towards the first face 112. Then, after retracting the second finger 106a, the first finger 104a may be retracted from the first edge 118. In some embodiments, retraction of the second finger 106a and the first finger 104a may be executed substantially simultaneously; however, in other embodiments, the fingers 104a, 106a may be retracted at different times. As illustrated in FIG. 15, by retracting the first and second fingers 104a, 106a, the external cover 110 relaxes against the storage device 132 without trapping the first or second fingers 104a, 106a between the external cover 110 and the storage device 132.

FIG. 16 illustrates an example end result of the above assembly acts, according to one illustrated embodiment, wherein the external cover 110 and the storage device 132 are ready for removal from the storage device assembly fixture 100. As illustrated, the external cover 110 does not completely surround and envelop the storage device 132. Instead, additional manipulation of the external cover 110 and the storage device 132 are necessary to complete the assembly process. Of course, in other embodiments, the storage device assembly fixture 100 may be designed to fully assemble the external storage device, such that additional manufacturing acts are not necessary.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A method of assembling an external storage device, the method comprising:
   providing an external cover to a storage device assembly fixture, the external cover having a first face and a second face generally parallel to and opposing the first face, the first face coupled to the second face at a back end of the external cover, the first face defining a first edge at a front end of the external cover opposite the back end, and the second face defining a second edge at the front end;
   placing the external cover within the storage device assembly fixture;
   engaging the first edge of the external cover with a first finger of the storage device assembly fixture;
   engaging the second edge of the external cover with a second finger of the storage device assembly fixture;
   pivoting the second finger away from the first finger to move the second face of the external cover away from the first face of the external cover; and
   inserting a storage device between the first face and the second face of the external cover.

2. The method of claim 1, wherein placing the external cover includes placing the first face of the external cover against a platform of the storage device assembly fixture.

3. The method of claim 2, wherein placing the external cover further includes positioning the back end of the external cover against a nest near the platform.

4. The method of claim 3, further comprising exerting a bias force against at least one side edge of the external cover extending between the back end and the front end in order to position the external cover before engaging the first edge with the first finger and the second edge with the second finger.

5. The method of claim 4, further comprising automatically detecting the external cover positioned against the nest, and exerting the bias force based at least in part on the detection.

6. The method of claim 1, wherein engaging the first edge with the first finger includes moving the first finger along a first axis until at least some portion of the first finger extends between first and second planes extending generally parallel with the first and second faces, respectively, and then moving the first finger along the first plane into engagement with the first edge.

7. The method of claim 1, wherein engaging the second edge with the second finger includes pivoting the second finger until at least some portion of the second finger extends between first and second planes extending generally parallel with the first and second faces, respectively, and then moving the second finger along the second plane into engagement with the second edge.

8. The method of claim 1, wherein engaging the second edge with the second finger includes applying a bias force to push the second finger against the second edge, and wherein the second finger may move radially away from or towards a pivot axis about which the second finger pivots while the second finger pivots away from the first finger to move the second face away from the first face.

9. The method of claim 1, wherein pivoting the second finger away from the first finger includes actuating a linear actuator to engage a pivot assembly coupled to the second finger.

10. The method of claim 1, wherein pivoting the second finger away from the first finger to move the second face away from the first face includes pivoting the second finger such that the second face forms approximately a thirty degree angle to the first face.

11. The method of claim 10, further comprising pivoting the second finger between approximately five and ten degrees back towards the first finger after inserting the storage device.

12. The method of claim 11, further comprising retracting the second finger from the second edge after pivoting the second finger between approximately five and ten degrees back towards the first finger.

13. The method of claim 12, further comprising retracting the first finger from the first edge after retracting the second finger.

14. The method of claim 11, further comprising automatically detecting insertion of the storage device, and pivoting the second finger between approximately five and ten degrees back towards the first finger based at least in part on the detection.

* * * * *